United States Patent [19]

Poxleitner et al.

[11] Patent Number: 4,763,001
[45] Date of Patent: Aug. 9, 1988

[54] APPARATUS FOR GENERATING AN IMAGE

[75] Inventors: Martin Poxleitner, Königsbronn; Josef Wohlfrom, Oberkochen; Kurt Otomanski, Aalen, all of Fed. Rep. of Germany

[73] Assignee: Carl-Zeiss-Stiftung, Heidenheim, Fed. Rep. of Germany

[21] Appl. No.: 904,243

[22] Filed: Sep. 5, 1986

[30] Foreign Application Priority Data

Sep. 5, 1985 [DE] Fed. Rep. of Germany ....... 3531666

[51] Int. Cl.$^4$ .............................................. G02B 26/10
[52] U.S. Cl. .................................... 250/334; 250/330; 250/347
[58] Field of Search ............... 250/334, 330, 253, 235, 250/347

[56] References Cited

U.S. PATENT DOCUMENTS

| | | | |
|---|---|---|---|
| 3,781,559 | 12/1973 | Cooper et al. | 250/334 |
| 3,912,927 | 10/1975 | Hoffman, II | 250/334 |
| 3,949,225 | 4/1976 | Aguilera | 250/334 |
| 4,238,674 | 12/1980 | Kuerbitz et al. | 250/347 |
| 4,323,776 | 4/1982 | Bridges et al. | 250/334 |
| 4,328,516 | 5/1982 | Colpack et al. | 250/330 |
| 4,520,504 | 5/1985 | Walker et al. | 250/330 |
| 4,560,869 | 12/1985 | Hien et al. | 250/334 |

FOREIGN PATENT DOCUMENTS

| | | |
|---|---|---|
| 2805531 | 12/1978 | Fed. Rep. of Germany . |
| 3329588 | 10/1984 | Fed. Rep. of Germany ...... 250/334 |
| 3341066 | 5/1985 | Fed. Rep. of Germany ...... 250/334 |
| 1435144 | 5/1976 | United Kingdom . |

Primary Examiner—Janice A. Howell
Assistant Examiner—William F. Rauchholz
Attorney, Agent, or Firm—Walter Ottesen

[57] ABSTRACT

In an apparatus for generating an image of a scene, preferably an image of a heat image, the image is moved line by line across a row of detectors by means of a scanning mirror. The signals thus generated control light-emitting elements via amplifiers. The light-emitting elements are also disposed in a row, and their light is also guided via the scanning mirror. The scanning of the image is done bidirectionally, that is, during the forward pass and return pass of the scanning mirror. For correction of the resultant phase error, which is brought about by a delayed triggering of the light-emitting elements, an optical deflector element is provided which can assume two defined positions. The first position is associated with the forward pass of the scanning mirror and the second position is associated with its return pass and these positions are entirely independent of the location of the scanning lines. The deflector element is preferably in the form of a plane-parallel plate, which is tilted into two angular positions in alternation by means of electromagnets.

5 Claims, 4 Drawing Sheets

APPARATUS FOR GENERATING AN IMAGE

FIELD OF THE INVENTION

The invention relates to an apparatus for generating an image of a scene such as an image of a heat image.

BACKGROUND OF THE INVENTION

An apparatus of this kind is known from United Kingdom Pat. No. 1 435 144, for example, being used there as a heat-imaging apparatus. In this apparatus, the radiant or heat image is scanned bidirectionally; that is, it is scanned during both the forward and return movement of the scanning mirror. The scanning mirror is pivotable about two axes and is triggered in such a way that the heat image is scanned line by line, with successive lines being spaced apart from one another at right angles to the line direction. The known apparatus operates by the principle known as double-line interlacing, in which the scanning mirror is tilted by a small amount at the end point of one scanning movement, such as the forward pass, and then tilts back by the same amount at the end point of the follow-on scanning movement, in this instance the return pass.

This kind of scanning improves the resolution in the direction of the linear detector array, for example, with 120 detectors in a row, 240 scanning lines are obtained. Light-emitting elements are arranged in a row like the detectors and are used for generating the visible image.

Each individual detector of the linear detector array is associated with one light-emitting element via amplifier means. Because of the finite electrical band width of this amplifier chain, a phase displacement occurs between the signals generated by the detectors and those supplied to the light-emitting elements. As a result, the light-emitting elements light up in a delayed manner. In unidirectional scanning, this would not be a problem; however, in bidirectional scanning it has a very disruptive effect, because of the different scanning directions. For instance, with a scanning direction from left to right, a target in the form of a bar would be reproduced with a shift to the right, while in the next scanning line, it would be shifted to the left. The target, which in actuality is a straight line, would thus be reproduced as a wavy line.

For overcoming this disruptive effect, the scanning mirror in a heat-imaging device known from United Kingdom Pat. No. 1 435 144 is disposed in a housing that can be tilted about an axis which defines an angle of approximately 45° with the line-scanning axis. The housing is fixedly connected to a lens that serves to project the light arriving from the light-emitting elements into an image plane. If the housing and hence the mirror are now tilted at the end point of a scanning movement, a movement component occurs that pivots the housing by a small amount in the line scanning direction. Thus, the lens connected with the housing pivots as well. All the components are matched to one another in such a way that this additional pivoting of the lens shifts the image in the image plane by precisely the amount that compensates for the phase error resulting from the phase displacement of the signal.

It is apparent that this kind of compensating apparatus is very difficult to adjust properly and that it requires very precise matching between the electrically produced and the optically produced effects. Furthermore, this apparatus can be used only for double-line interlacing, because compensation is possible only in two locations of the scanning lines, that is, the locations corresponding to the forward and return passes of the scanning mirror.

Another apparatus for compensating for the phase error caused by the phase displacement of the electrical signal is disclosed in German Pat. No. 2 805 531. In this apparatus, two rows of light-emitting elements are provided for generating the visible image, which are laterally displaced from one another in accordance with the error that is to be compensated and which are driven separately upon the forward and the return passes of the scanning mirror.

This apparatus has the disadvantage that the number of light-emitting elements relative to the number of detectors is doubled, so that the number of amplifiers and electrical connections must also be doubled, quite aside from any further electronic complexity for amplifier switching.

While this expense may still be tenable for an apparatus operating pursuant to the double-line interlacing principle, it becomes prohibitive if the resolution in the direction of the linear detector array is to be still further improved.

SUMMARY OF THE INVENTION

It is an object of the invention to provide an apparatus of the above-described type for generating an image of a scene, preferably an image of a heat image such that with the least possible complexity for compensating for the phase error, a further improvement of vertical resolution and hence of geometric resolution is attained.

The apparatus of the invention includes a linear array of detectors defining a plane; first imaging means for forming an image of the scene in the plane; a scanning mirror for deflecting the image; first drive means for driving the scanning mirror; control means for generating control signals to actuate the first drive means and drive the scanning mirror so as to periodically move the image through a forward pass and a return pass in a direction perpendicular to the detectors and along successive scan lines spaced one from the other in a direction perpendicular to the scan lines; a linear array of light-emitting elements for emitting light rays in response to the respective outputs of the detectors; amplifier means for connecting the light-emitting elements to corresponding ones of the detectors; second imaging means for imaging the light rays emitted by the light-emitting elements onto the scanning mirror so as to direct them toward a predetermined observing location; and, correcting means for deflecting the light rays by a predetermined angle after each pass through one of the scan lines with each successive deflection of the light rays being opposite to the immediate preceding deflection thereof.

According to a feature of the invention, the correction means mentioned above can comprise optical deflection means and electrical means for alternatingly pivoting this element into two defined locations. The optical deflection means is disposed in the beam path between the light-emitting elements and the scanning mirror, and is controlled by the signals which effect the line scanning of the scanning mirror.

The correction means of the apparatus of the invention is entirely mechanically uncoupled from the scanning mirror. This makes it possible to arrange and drive the correction means in such a way that the deflection it performs upon the light originating at the light-emitting elements is associated only with the scanning directions and is entirely independent of the position of a given scanning line at any time.

As a result, the apparatus according to the invention has the advantage that it can be operated with a desired vertical resolution of the generated image, without any changes having to be made to the correction means itself. Thus the apparatus can in particular be operated without any line interlacing, with double-line interlacing, or with quadruple-line interlacing. In each mode of operation, the correction means compensates completely for the effects caused by the phase delay of the electrical signals.

A particularly advantageous embodiment of the invention provides that the correction means include an optical deflecting means in the form of a plane-parallel plate and wherein the second drive means is an electromagnetic device for alternately pivoting the plane-parallel plate into two different angular positions. This embodiment is simple in design, functions well and is not difficult to assemble and adjust.

Another embodiment of the apparatus according to the invention is distinguished by good vertical resolution, and it makes particularly advantageous use of the correction means described herein.

BRIEF DESCRIPTION OF THE DRAWINGS

The invention will now be described with reference to the drawings, wherein:

FIGS. 2a to 2e show various phases of an image scan with quadruple-line interlacing;

DESCRIPTION OF THE PREFERRED EMBODIMENTS OF THE INVENTION

Figures 1, 2:
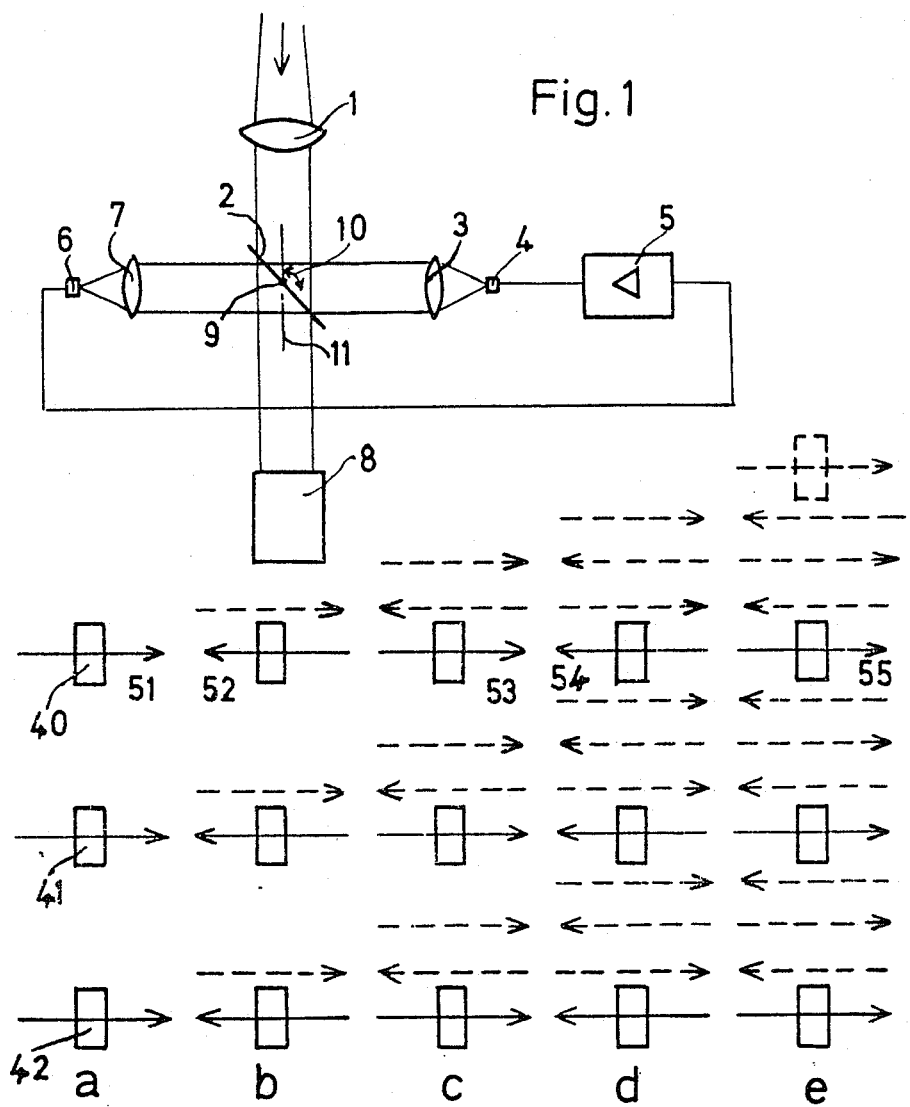
FIG. 1 is a schematic of a heat-imaging apparatus.

In the heat-imaging apparatus shown in FIG. 1, an entry optical element 1 is shown, which projects the heat radiation arriving from the scene into the plane of a linear detector array 4, via a scanning mirror 2 and a further optical element 3. The linear detector array 4 comprises individual infrared detectors arranged in a row. In FIG. 1, this linear array of detectors 4 is disposed at right angles to the plane of the drawing. Each individual detector is connected via a schematically illustrated amplifier chain 5 with one light-emitting element 6, which may for instance be in the form of a light-emitting diode. Such diodes 6 are disposed in a row, which in FIG. 1 should again be imagined as extending at right angles to the plane of the drawing. The number of light-emitting elements 6 corresponds to the number of individual detectors 4. The light issuing from the elements 6 is converted via an optical element 7 into parallel rays defining a beam which is deflected by the back of the scanning mirror 2 onto an image-viewing device 8. By way of example, the device 8 can be embodied as an image amplifier or as a telescope.

When the heat-imaging apparatus is in operatron, the scanning mirror 2 is pivoted about the axis 9 arranged parallel to the detector array 4, in the direction of the arrow 10. As a result, the heat image is moved over the detection row 4 in the direction perpendicular to the line defined by the row of detectors, so that each detector in this row generates a video signal associated with one image line. This video signal controls the brightness of the associated light-emitting element 6; that is, for each image point scanned, the non-visible infrared image signal arriving from the scene is converted into a visible signal. The light issuing from the light-emitting elements 6 is deflected by the back of the scanning mirror 2, so that the image generated in the image-viewing device 8 is independent of any fluctuations in the scanning movement of the mirror 2.

The scanning mirror 2 is also tiltable about an axis 11, by very small amounts. By means of such tilting, the scanning lines scanned during the forward pass and return pass of the scanning mirror 2 are spaced apart in a direction which is at right angles to the line direction, as the line interlacing method requires. Usually, the double-line interlacing method is used; that is, in the apparatus shown here, the scanning lines assume different positions during the forward pass and during the return pass of the scanning mirror 2.

In the apparatus shown in FIG. 1, the scanning and the buildup of the image are done bidirectionally, that is, during the forward and return passes of the scanning mirror 2.

Figure 3:
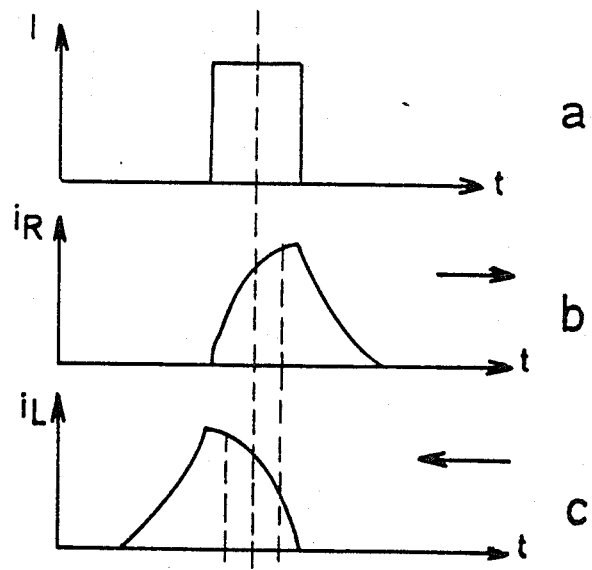
FIG. 3 shows the signals occurring in a bidirectional image scan.

If the heat image that is to be recorded has a region of high radiation intensity I, for example, then the time course of intensity shown in FIG. 3a is obtained. The signal generated by the infrared detector 4 that is scanned substantially corresponds to this course. The signal is supplied to the amplifier chain 5 which has a finite electrical band width. Because of this, the phase displacement shown in FIGS. 3b and 3c between the signal generated by the detector 4 and the signal supplied to the associated light-emitting diode 6 occurs. It will be appreciated that the centroid of the signals generated during the forward pass (FIG. 3b) and during the return pass (FIG. 3c) of the scanning are displaced by an amount $\Delta x$ relative to the peak of the signal that is actually to be represented (FIG. 3a). This error is known as phase error.

In order to increase the image resolution in the direction of the linear detector array 4, heat-imaging apparatus are typically operated by the line interlacing method, with double-line interlacing being the usual method used; that is, the number of scanning lines is doubled.

FIGS. 2a to 2e show different phases in image scanning by the quadruple-line interlacing method. Such a method was previously impracticable, because the means for correcting the phase error were not available.

Figure 6:
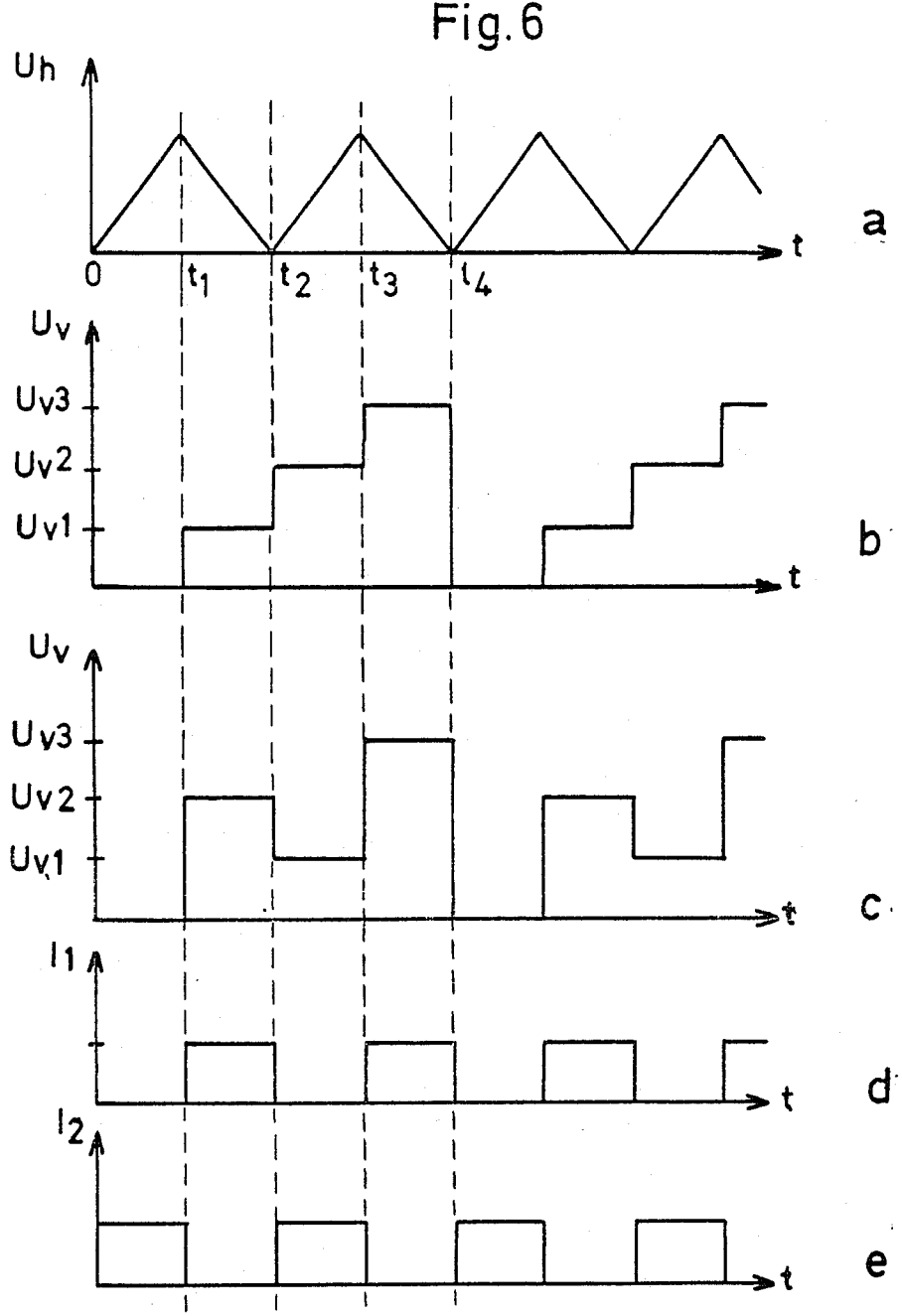

In FIG. 2, the various scanning phases are shown for the detectors 40, 41, 42, selected by way of example, of the linear detector array 4. The corresponding signals used for controlling the scanning mirror 2 are shown in FIGS. 6a and 6b.

In the first scanning phase of FIG. 2a, the scanning mirror 2 is pivoted about the axis 9 and moves the heat image along the first scanning line 51 across the detectors. At the end point of the forward pass of the mirror, that is, at time $t_1$, the scanning mirror 2 is tilted about the axis 11 by the delivery of the signal $U_{V1}$ shown in FIG. 6b, so that during the ensuing return pass the scanning line 52 is scanned. The position of the scanning line scanned just previously is represented by a broken line in FIG. 2b. At time $t_2$, the scanning mirror 2 is tilted about the axis 11 by a further amount, by the delivery of the signal $U_{V2}$. During the now ensuing third scanning line, which is scanned during the times $t_2$ and $t_3$, the third scanning line 53 is guided across the detectors. In FIG. 2c the previously scanned scanning lines are represented by broken lines. At time $t_3$, the scanning mirror 2 is tilted by a further angular amount, by the delivery of the signal $U_{V3}$, and during the ensuing scanning movement scans the scanning line 54 of FIG. 2d. In FIG. 2d, once again, the previously scanned scanning lines are shown as broken lines. After the end of one scanning cycle, at time $t_4$, the signal of FIG. 6b tilts the mirror 2 back again about the axis 11, so that the scanning line 55 first scanned in the next scanning operation again corresponds to the scanning line 51.

It will be apparent from FIG. 2 that the number of scanning lines scanned is four times the number of detectors 4. If the linear detector array 4 contains 120 individual detectors, for instance, 480 scanning lines are scanned; that is, the vertical resolution of the image is improved substantially.

Figure 4:
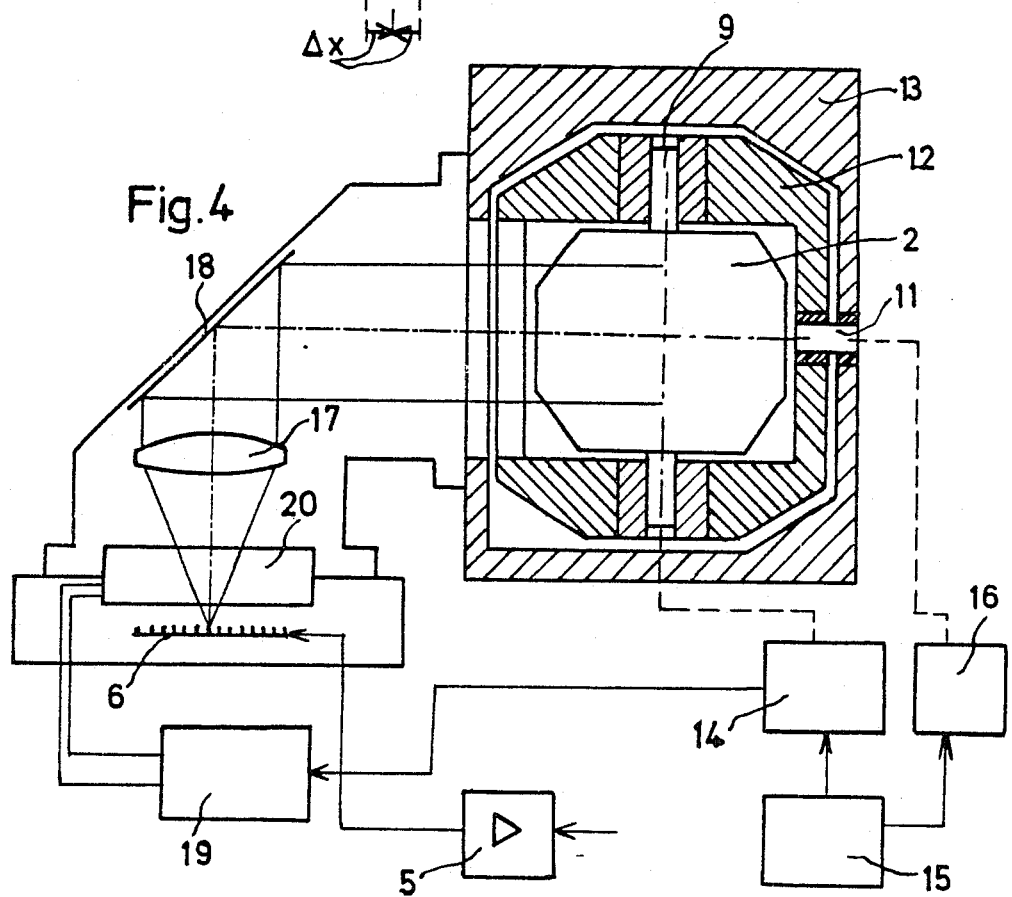
FIG. 4 is a schematic of an embodiment of the apparatus according to the invention.

In the embodiment shown in FIG. 4, the scanning mirror 2 is supported in a mirror frame 12 such that it can be pivoted about the axis 9. The pivoting of the mirror 2 is effected via a schematically illustrated device 14, which may, for example, be embodied as a motor. This device 14 is supplied with the signal shown in FIG. 6a by a control unit 15. The mirror frame 12 is tiltable in a fixed frame 13 about an axis 11. This tilting is effected by means of a device 16, which may, for example, be embodied as a motor. The device 16 is supplied via the control unit 15 with the signal shown in FIG. 6b, for example.

The radiation issuing from the heat image is deflected by the scanning mirror 2 onto a linear detector array that is not shown in FIG. 4. The signal coming from this detector array is delivered via an amplifier chain 5 to the light-emitting diodes 6, which are arranged in a row. The light generated by these diodes is projected toward infinity by a schematically illustrated optical element 17 and deflected via a deflecting mirror 18 onto the back of the scanning mirror 2. From there, the light reaches the image-viewing device 8 of FIG. 1 (not shown in FIG. 4).

In the divergent beam path between the light-emitting diodes 6 and the optical element 17 there is a correction device 20, which corrects the phase error. This correction device comprises an optical deflecting element and electrical means 19 for alternatingly pivoting this element into two defined positions. The electrical means 19 is synchronized via the device 14 which pivots the mirror 2 about the axis 9.

Figure 5:
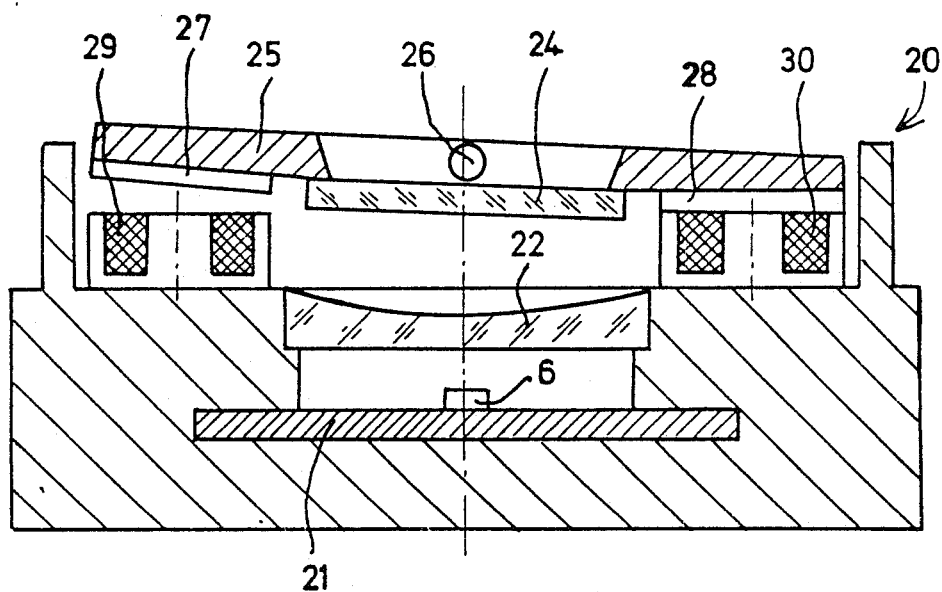
FIG. 5 shows an embodiment of the correction device used in the apparatus of FIG. 4; and, FIGS. 6a to 6e show the course over time of the signals for driving the scanning mirror and the correction device of the apparatus shown in FIG. 4.

A highly advantageous embodiment of the correction component 20 is shown in FIG. 5. Here again, reference numeral 6 identifies a light-emitting diode which is disposed on a substrate 21. The light-emitting diodes are disposed in a row, which is at right angles to the plane of the drawing in FIG. 5. Behind the diode 6 as viewed in the direction of the beam, there is a lens 22. The actual correction component itself comprises a plane-parallel or flat plate 24, which is disposed on a carrier 25 such that plate 24 is tiltable about an axis 26. The carrier 25 is provided with two magnet armatures 27 and 28, which coact with the two electromagnets 29 and 30.

The electromagnet 29 is supplied via the control unit 19 with a current $I_1$, the course of which over time is shown in FIG. 6d. The course over time of the current $I_2$ supplied to the electromagnet 30 is shown in FIG. 6e.

From this illustration, it will be apparent that the plane-parallel plate 24 assumes two defined angular positions in alternation, and in these positions, the plane-parallel plate 24 deflects the light issuing from the light-emitting diodes 6 by an amount $\Delta x$ each time (see FIG. 3c).

One angular position of the plane-parallel plate 24 is associated with the forward pass of the scanning mirror 2, or stated otherwise, the one angular position is associated with the deflection signals shown in FIG. 6a during the times 0 to $t_1$ and $t_2$ to $t_3$. The other angular position of the plane-parallel plate 24 is associated with the return pass of the scanning mirror, or in other words, with the signal segments of FIG. 6a occurring during the times $t_1$ to $t_2$ and $t_3$ to $t_4$. This association is entirely independent of the signals of FIG. 6b; that is, it is entirely independent of the tilted position of the scanning mirror 2 with respect to the axis 11.

Thus, it becomes clear that the correction device described and shown here is universally applicable, regardless of whether the heat-imaging device operates without line interlacing, with double-line interlacing, or with quadruple-line-interlacing. Any other line interlacing method is also possible, without any alteration of the correction device or its control means being required.

The correction device of FIG. 5 is advantageously used in a heat-imaging apparatus which is operated by the quadruple-line interlacing method of FIG. 2. If with this method, the control unit 16 of the scanning mirror 2 is supplied with signals as in FIG. 6b, then the scanning takes place as shown in FIG. 2, that is, in the order 1, 2, 3, 4. It is also possible to supply the control unit 16 with a signal the course of which is shown in FIG. 6c. In that case, the scanning is again done by the quadruple-line interlacing method, but the order is now 1, 3, 2, 4.

Instead of the correction device of FIG. 5, other deflector elements can also be used. For instance, it is possible to tilt the deflector mirror 18 of FIG. 4 into two defined angular positions, associated with the forward pass and the return pass respectively, of the scanning mirror 2.

It is also possible to use other deflector elements, such as a sliding lens micrometer in the parallel beam path between the mirror 2 and the optical component 17. A sliding lens micrometer of this kind comprises two lenses, one of which is fixed while the other one assumes two defined displacement positions.

It is understood that the foregoing description is that of the preferred embodiments of the invention and that various changes and modifications may be made thereto without departing from the spirit and scope of the invention as defined in the appended claims.

What is claimed is:

1. Apparatus for generating an image of a scene such as an image of a heat image, the apparatus comprising:
    a linear array of detectors defining a plane;
    first imaging means for forming an image of said scene in said plane;
    a scanning mirror for deflecting said image;
    first drive means for driving said scanning mirror;
    control means for generating control signals to actuate said first drive means and drive said scanning mirror so as to periodically move said image through a forward pass and a return pass in a direction perpendicular to said detectors and along successive scan lines spaced one from the other in a direction perpendicular to said scan lines;

a linear array of light-emitting elements for emitting light rays in response to the respective outputs of said detectors;

amplifier means having a finite band width for connecting each of said light-emitting elements to a corresponding one of said detectors which introduces a phase error between the signal generated by the detector and the signal supplied to the light-emitting diode;

second imaging means for imaging the light rays emitted by said light-emitting elements onto said scanning mirror so as to direct them toward a predetermined observing location; and, correcting means for deflecting said light rays by a predetermined angle after each pass through one of said scan lines with each successive deflection of said light rays being opposite to the immediate preceding deflection thereof, said correcting means including non-focussing optical deflecting means disposed in the path of said light rays between said light-emitting elements and said scanning mirror, said non-focussing optical deflecting means being pivotally mounted so as to pivot from a first position to a second position in correspondence to said forward pass and from said second position back to said first position in correspondence to said return pass for deflecting said light rays through said predetermined angle so as to eliminate said phase error; and, second drive means connected to said control means for receiving said control signals to drive said optical deflecting means between said positions.

2. The apparatus of claim 1, wherein said light rays emitted by said light-emitting elements define a divergent beam path between said light-emitting elements and said second imaging means; said first and second positions being respectively different angular positions; said second drive means being electromagnetic means for alternately pivoting said optical deflecting means into said angular positions; and, said optical deflecting means being a flat plate.

3. The apparatus of claim 1, said light rays emitted by said light-emitting elements define a parallel beam path between said second imaging means and said scanning mirror; said first and second positions being respectively different angular positions; said optical deflecting means being a reflex mirror mounted between said light-emitting elements and said second imaging means; and, said second drive means being electromagnetic means for alternately pivoting said reflex mirror into said angular positions.

4. Apparatus for generating an image of a scene such as an image of a heat image, the apparatus comprising:
a linear array of detectors defining a plane;
first imaging means for forming an image of said scene in said plane;
a scanning mirror for deflecting said image;
first drive means for driving said scanning mirror;
control means for generating control signals to actuate said drive means and drive said scanning mirror so as to periodically move said image through a forward pass and a return pass in a direction perpendicular to said detectors and along four successive scan lines between each two mutually adjacent ones of said detectors, said four successive scan lines being spaced one from the other in a direction perpendicular to the latter so as to cause said detectors to issue respective detector signals;

a linear array of light-emitting elements for emitting light rays in response to said respective detector signals of said detectors;

amplifier means for connecting said detectors to corresponding ones of said light-emitting elements and for applying respective output signals to the latter displaced in phase from said detector signals;

second imaging means for imaging the light rays emitted by said light-emitting elements onto said scanning mirror so as to direct them toward a predetermined observing location; and, correcting means for correcting for the displacement in phase between said output signals applied to said light-emitting elements and said detector signal, said correcting means including: non-focussing optical means arranged in the path of said light rays between said light-emitting elements and said scanning mirror; and, second drive means responsive to said control signal for actuating said non-focussing optical means for movement between only two predetermined angular positions so as to effect predetermined deflections of said light rays for corresponding ones of said scan lines for each of said passes so as to correct for the displacement in phase between said output signals and said detector signals.

5. Apparatus for generating an image of a scene such as an image of a heat image, the apparatus comprising:
a linear array of detectors defining a plane;
first imaging means for forming an image of said scene in said plane;
a scanning mirror for deflecting said image;
drive means for driving said scanning mirror;
control means for generating control signals to actuate said drive means and drive said scanning mirror so as to periodically move said image through a forward pass and a return pass in a direction perpendicular to said detectors and along successive scan lines spaced one from the other in a direction perpendicular to said scan lines so as to cause said detectors to issue respective detector signals;

a linear array of light-emitting elements for emitting light rays in response to said respective detector signals;

amplifier means for connecting said detectors to corresponding ones of said light-emitting elements and for applying respective output signals to the latter displaced in phase from said detector signals;

second imaging means for imaging the light rays emitted by said light-emitting elements onto said scanning mirror so as to direct said light rays toward a predetermined observing location; and, non-focussing optical deflecting means disposed in the path of said light rays between said light-emitting elements and said scanning mirror, said non-focussing optical deflecting means being responsive to said control signals for movement between only two predetermined angular positions for deflecting said light rays by a predetermined angle after each pass through one of said scan lines with each successive deflection of said light rays being opposite to the immediate preceding deflection thereof so as to compensate for the displacement in phase between said output signals applied to said light-emitting elements and said detector signals.

* * * * *